United States Patent [19]

Kubo et al.

[11] Patent Number: 5,052,722
[45] Date of Patent: Oct. 1, 1991

[54] INTERMEDIATE COUPLER FOR HOSES

[75] Inventors: Hiroshi Kubo, Kaisei; Hironobu Ito, Odawara, both of Japan

[73] Assignee: Honda Giken Kogyo Kabushiki Kaisha, Tokyo, Japan

[21] Appl. No.: 515,522

[22] Filed: Apr. 30, 1990

Related U.S. Application Data

[63] Continuation of Ser. No. 239,895, Sep. 2, 1988, abandoned.

[30] Foreign Application Priority Data

Sep. 3, 1987 [JP] Japan .................. 62-135010[U]

[51] Int. Cl.$^5$ ............................................. F16L 3/08
[52] U.S. Cl. ..................... 285/62; 285/150; 285/256
[58] Field of Search ............. 285/222, 382, 61, 62, 285/158, 256, 175

[56] References Cited

U.S. PATENT DOCUMENTS

| | | | |
|---|---|---|---|
| 1,776,615 | 9/1930 | Boothman et al. | 285/382 X |
| 1,994,226 | 3/1935 | Martocello | 285/175 X |
| 2,165,621 | 7/1939 | Donahue et al. | 285/222 X |
| 2,913,820 | 11/1959 | Barth | 285/222 X |
| 3,751,076 | 8/1973 | Thais et al. | 285/62 |
| 3,778,090 | 12/1973 | Tobin | 285/222 |
| 3,940,168 | 2/1976 | Balon | 285/382 X |
| 4,214,358 | 7/1980 | Clerc | 285/382 |
| 4,650,223 | 3/1987 | Miyazaki | 285/256 X |

FOREIGN PATENT DOCUMENTS

| | | | |
|---|---|---|---|
| 641507 | 8/1928 | France | 285/222 |
| 706420 | 6/1931 | France | 285/61 |
| 60-178690 | 11/1985 | Japan | |
| 1071856 | 6/1967 | United Kingdom | 285/382 |

Primary Examiner—Dave W. Arola
Attorney, Agent, or Firm—Armstrong, Nikaido, Marmelstein, Kubovcik, & Murray

[57] ABSTRACT

Intermediate coupler for hoses attachable to a vehicle body including a fitment body with hose joints at opposite ends and a mounting bracket caulkedly bound to an intermediate base portion of the fitment body. The fitment body has, at the intermediate base portion in a consecutively stepped manner, a bracket mounting portion and a flange provided on one side of the bracket mounting portion. The flange has a diameter larger than that of the bracket mounting portion. The mounting bracket has an insert hole provided with a tapered surface divergent toward its outer end face.

3 Claims, 3 Drawing Sheets

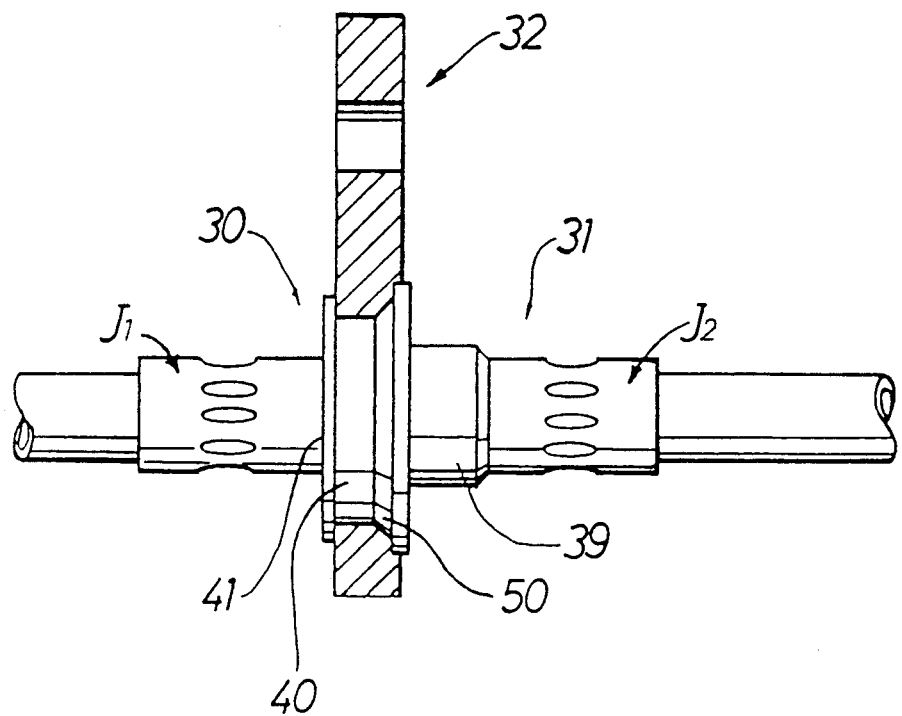
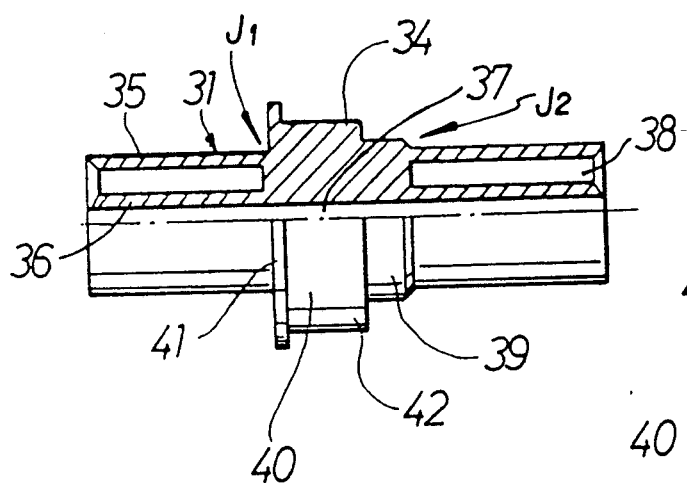
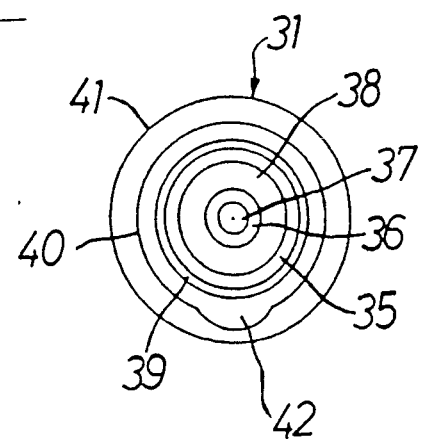

INTERMEDIATE COUPLER FOR HOSES

This application is a continuation of application Ser. No. 239,895 filed Sept. 2, 1988, now abandoned.

BACKGROUND OF THE INVENTION

The present invention relates to an intermediate coupler for connecting two rubber hoses, and particularly, to such an intermediate coupler for connecting hydraulic brake hoses for an automobile at opposite ends thereof to fix them to a vehicle body.

A flexible hose, such as a hydraulic brake hose, attached as an automobile part to a vehicle body is itself held and fixed at an intermediate portion thereof to the vehicle body to prevent any contacting with a tire. A metal band or an intermediate coupler is generally used as a means for fixing the hose to the vehicle body.

FIGS. 7 to 9 show conventionally known metal bands or intermediate couplers.

FIG. 7 shows a mounting structure in which a rubber hose 3 is inserted through a rubber clamp 2 having flanges 1 mounted at its opposite ends. An outer periphery of the clamp 2 is clamped by a metal band 4. A bolt is inserted through a mounting bolt bore 5 provided in the metal band 4 to fix the hose 3 to a vehicle body or the like.

FIG. 8 shows an intermediate coupler comprising a mounting bracket provided on double opened-ended nipple. More specifically, a nipple 12 and a sleeve 13 are connected to each of opposite sides of an intermediate base portion 10 with the nipples 12 communicating with each other through a coupling hole 17. A flange portion 14 is provided on an outer periphery of the intermediate base portion 10, with a portion of the flange portion 14 being projected in one direction to serve as a mounting bracket 15. A bolt bore 16 is provided in the mounting bracket 15, so that a bolt 18 can be inserted into the bolt bore 16 to fix the coupler to a vehicle body or the like.

FIG. 9 shows another prior art intermediate coupler in sectional view corresponding approximately to a vertical section taken along a line through the middle of the mounting bracket 15 in FIG. 8. This intermediate coupler is comprised of a fitment body 20 and a mounting bracket 21. The fitment body 20 comprises nipples and sleeves connected to opposite sides of an intermediate base portion 23. The bracket 21 has an octagonal insert hole 22 provided at one end thereof, so that an intermediate base portion 23 having an outer periphery likewise formed into an octagonal profile is inserted into the insert hole 22 in such a manner that they are fixed into one piece. The bracket 21 is fixed to a vehicle body or the like by inserting a bolt into a bolt bore 24 made at the other end thereof.

However, the above prior art examples are accompanied by the following problems:

In the example shown in FIG. 7, because the rubber hose 3 is held and fixed by the metal band 4, the rubber hose 3 may be crushed, obstructing flow of a fluid if the clamping force of the metal band 4 is too strong. On the other hand, if the clamping force is too weak, the position of hose held by the metal band 4 varies upon application of external force on the rubber hose 3 and for example, when the rubber hose 3 is a hydraulic brake hose, it can come into contact with a tire.

The intermediate coupler shown in FIG. 8 is made by cutting a round bar. For this reason, the shape of a tool is complicated, and an increased number of machinings is required. Further, the mounting bracket 15 is significantly large as compared with the outside diameter of the nipple and hence, the yield of the product is reduced. This results in an increase in overall cost of such an intermediate coupler.

Further, the intermediate coupler shown in FIG. 9 is made by assembling two parts and hence, increases in yield but is accompanied by the following problems: The insert hole 22 in the bracket 21 and the outer periphery of the intermediate base portion 23 of the fitment body 20 must be high in dimensional accuracy and if both of them are not so, the press-fitting cannot be performed, or slipping-off may occur. In addition, because of the polygonal shapes, an increased number of machinings is required.

The present invention has been accomplished with such circumstances in view, and it is an object of the present invention to provide an intermediate coupler for hoses which is easy and inexpensive to manufacture and is capable of reliably fixing and holding hoses.

SUMMARY OF THE INVENTION

To attain the above object, the present invention is an intermediate coupler for hoses comprising a fitment body having hose joints at its axially opposite ends, and a mounting bracket caulkedly bound to a intermediate base portion of the fitment body into one piece. The fitment body is formed at the intermediate base portion thereof in a consecutively stepped manner with a bracket mounting portion and a flange provided on one side of the latter and having a diameter larger than that of the bracket mounting portion. The mounting bracket is provided with an insert hole into which the bracket mounting portion can be inserted. The insert hole is provided with a tapered surface divergent toward its outer end face, so that the bracket mounting portion ca be inserted into the insert hole and bound to the tapered surface by caulking.

Another feature of the present invention is that a sleeve and a nipple are formed on each of the hose joints formed on the opposite ends of the fitment body with a gap left therebetween adapted to receive an end of a hose inserted therein. The nipples communicate with each other through the intermediate base portion.

A further feature of the present invention is that the bracket mounting portion of the fitment body is provided at its outer peripheral surface with a protrusion formed in a ridged manner. The insert hole in the mounting bracket is provided on its inner surface with a recess adapted to be engaged by the protrusion.

A still further feature of the present invention is that a step is consecutively formed at one end face of the insert hole in the mounting bracket to extend from a divergent outer peripheral end of the tapered surface in a diametrically outward direction.

With the above constructions, the fitment body is formed, at the intermediate base portion thereof in a consecutively stepped manner, with a bracket mounting portion and a flange having a diameter larger than that of the bracket mounting portion. The mounting bracket is provided with an insert hole into which the bracket mounting portion can be inserted, the insert hole being provided with a tapered surface divergent toward its outer end face. Therefore, in caulkingly binding the fitment body and the mounting bracket together, a portion of the bracket mounting portion is plastically deformed smoothly along the tapere surface and filled up in the ga around the periphery of the tapered surface with no clearance left to ensure that firm caulking and binding is provided between the insert hole and the bracket mounting portion. This causes a strong prevention of slipping-off between the fitment body and the mounting bracket and allows the hose to be held and fixed.

In addition, fitting of the protrusion of the fitment body in the recess of the mounting bracket further enhances the prevention of relative rotation the fitment body and the mounting bracket.

Further, by the formation of the step extending in the diametrically outward direction from the divergent end edge of the tapered surface, the gap between the insert hole in the mounting bracket and the fitment body is eliminated, thereby providing a product excellent in resistance to corrosion.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 1 to 6 illustrate an embodiment of the present invention, wherein

FIG. 1 is a partially sectional front view of an intermediate coupler with rubber hoses attached thereto;

FIG. 2 is a semi-sectional front view of a fitment;

FIG. 3 is a right hand side view of the fitment;

FIG. 4 is a front view of a mounting bracket;

FIG. 5 is a vertical sectional view of the bracket; and

FIG. 6 is a sectional front view of the fitment body and the mounting bracket illustrating a step of securing them; and FIG. 7 to 9 illustrate the prior art couplers, wherein FIG. 7 is a front view of the coupler using a metal band;

FIG. 8 is a semi-sectional view of the coupler made by integral cutting; and

FIG. 9 is a sectional view of another known coupler formed of two parts.

DETAILED DESCRIPTION OF A PREFERRED EMBODIMENT

An embodiment of the present invention will now be described with a reference to the accompanying drawings.

Figure 4:
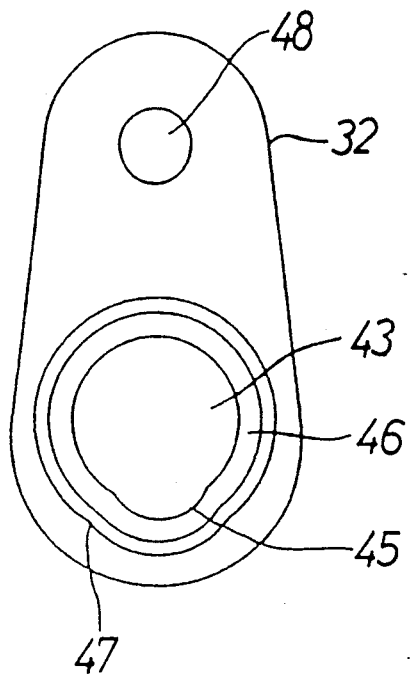
Figure 5:
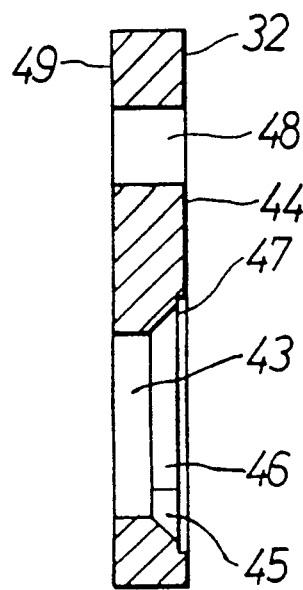

FIG. 1 is a partially sectional front view of an intermediate coupler fitted with a rubber hose; FIG. 2 is a semi-sectional front view of a fitment body; FIG. 3 is a right side view of the fitment body; FIG. 4 is a front view of a mounting bracket; and FIG. 5 is a vertical sectional view of the bracket.

The intermediate coupler 30 according to the present embodiment is comprised of the fitment body 31 and the mounting bracket 32 connected to the fitment body 31.

The fitment body 31 comprises a pair of sleeves 35 and a pair of nipples 36 which are connected to each of hose joints $J_1$ and $J_2$ lying on the opposite sides of an intermediate base portion 34. The nipples 36 communicate with each other through a coupling hole 37. An end of a hose is inserted into a clearance between each sleeve 35 and the respective nipple 36. The intermediate base portion 34 is formed at its outer periphery, in a successively stepped manner, with a punch member insert portion 39 having a diameter larger than the outside diameter of the sleeve 35, the bracket mounting portion 40 having a diameter larger than that of the punch member insert portion 39, and a flange 41 having a diameter larger than that of the bracket mounting portion 40. These punch member insert portion 39, bracket mounting portion 40 and flange 41 are all formed concentrically with the sleeve 35. The bracket mounting portion 40 has a protrusion 42 formed by projection of a portion of its outer periphery. The protrusion 42 projects in a circular arc and cooperates with a recess 45 of the mounting bracket 32 to serve as a detent. The bracket mounting portion 40 is formed to have an axial length larger than the wall thickness of the mounting bracket 32, so that a tapered surface 46 and a step 47 of the mounting bracket 32 can be sufficiently buried, as described hereinafter.

On the other hand, the mounting bracket 32 is a plate-like member and has at one end an insert hole 43 into which the bracket mounting portion 40 of the fitment body 31 is inserted, and further has, at a portion of a peripheral surface of the insert hole 43, a recess 45 into which the protrusion 42 of the fitment body 31 is fitted. Moreover, an inner surface of the insert hole 43 including the recess 45 has a tapered surface 46 divergent from its middle depth point toward its outer end face. Additionally, the step 47 is formed in succession to extend from an outer peripheral end of the tapered surface 46 in a diametrically outward direction. In other words, the step 47 is formed from a surface 44 of the mounting bracket 32, and the tapered surface 46 is consecutive from an inner end of the step 47.

Furthermore, the other end of the mounting bracket 32 is provided with a bolt hole 48.

It should be noted that although the detent protrusion 42 has been formed in a circular arc in the above embodiment, but is necessarily not intended to be limited thereto and can be formed to any configuration. Of course, the configuration of the recess 45 in the insert hole 43 is changed depending upon the configuration of the protrusion 42. In addition, two or more protrusions 42 and recesses 45 may be formed.

Description will now be made of a step of coupling the fitment body 31 and the mounting bracket 32 to the above construction.

Figure 6:
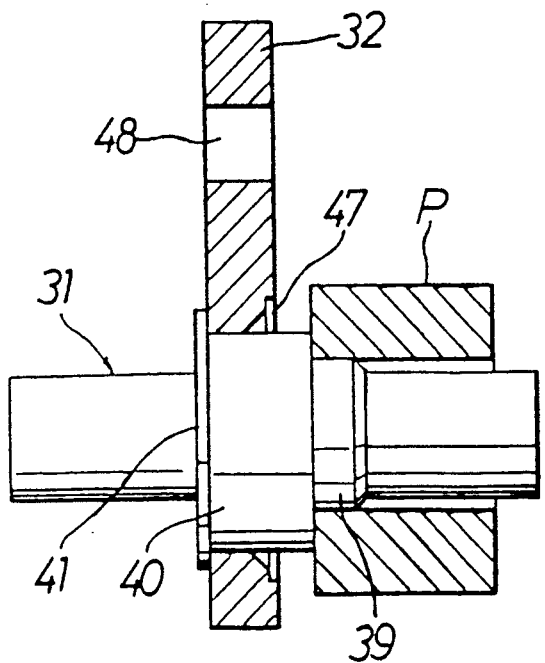
Figure 7:
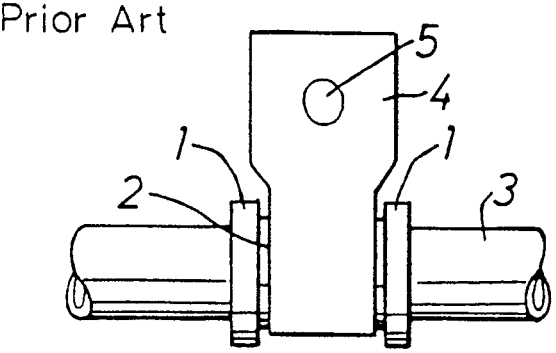
Figure 8:
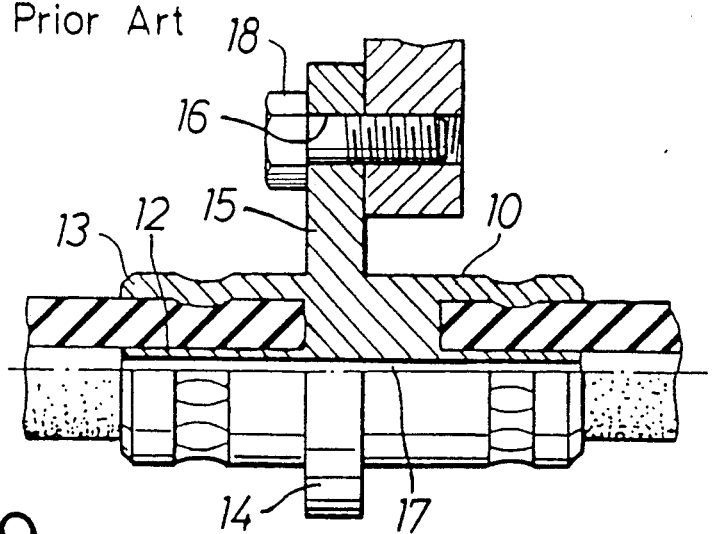
Figure 9:
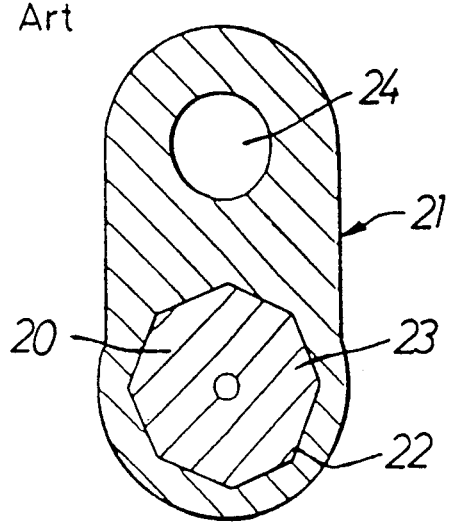

First, while positioning the protrusion 42 of the fitment body 31 and the recess of the insert hole 43, the bracket mounting portion 40 is inserted into the insert hole 43 in the bracket 32, so that the flange 41 abuts against a back surface 49 of the bracket 32. A punch member P is then inserted into the punch member insert portion 39 until it abuts against the side face of the bracket mounting portion 40 (see FIG. 6). The outside diameter of the punch member P is sized to close the step 47 of the insert hole 43.

Then, the punch member P is urged in an axial direction. This urging causes the bracket mounting portion 40 to be crushed and plastically deformed, thereby forming an annular built-up ridge 50 which fills up the tapered surface 46 and the step 47. This allows the bracket mounting portion 40 to be caulked into the insert hole 43. As a result, the fitment body 31 and the mounting bracket 32 are firmly bound together by the flange 41 and the annular ridge 50 and thus prevented from being slipped out and from being circumferentially rotated by the protrusion 42 and the recess 45.

In this manner, the fitment body 31 and the mounting bracket 32 can be bound into one piece merely by urging the punch member P.

In addition, since the step 47 is formed consecutively on the other peripheral end of the tapered surface 46, and the annular ridge formed by crushing of the bracket mounting portion 40 to provide a build-up of the wall thereof is buried in the step 47, it is possible to eliminate the gap between the insert hole 43 and the bracket mounting portion 40 as compared with the case where only the tapered surface 46 is provided. Therefore, a plating is usually carried out after binding of the fitment body 31 with the mounting bracket 32, but the plated metal skin cannot be peeled off because the gap between the fitment body and the bracket 32 is eliminated. This caused the resistance to corrosion to be extremely improved.

As discussed above, according to the invention, it is possible to simply, easily and firmly bind the fitment body having the hose joints at the opposite ends and the mounting bracket to each other, and particularly to further insure the prevention of axial slipping, thus providing an intermediate hose coupler capable of reliably connecting and holding two hoses.

Further, according to the invention, two hoses can be reliably connected without deformation.

Still further, according to the invention, the engagement of the protrusion in the recess prevents the relative rotation of the fitment body and the mounting bracket, thereby enabling a further enhanced coupling between them.

Yet further, according to the invention, by the formation of the step consecutively to the outer peripheral end of the insert hole in the mounting bracket, any gap is avoided at the caulkingly bound portion between the mounting bracket and the fitment body, leading to an improvement in resistance to corrosion of the intermediate hose coupler.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An intermediate coupler for hoses comprising:
   a fitment body including hose joints at axially opposite ends and an intermediate base portion between the joints, the intermediate base portion being provided in a consecutively stepped manner with a bracket mounting portion and a flange having a diameter larger than the bracket mounting portion on one side of the bracket mounting portion; and
   a mounting bracket formed with an insert hole therethrough, said insert hole being formed at an axially intermediate portion of an inner surface thereof with a tapered surface which is divergent toward an outer surface of the mounting bracket;
   said bracket mounting portion extends through said insert hole and the mounting bracket is bound integrally to the intermediate base portion by a portion of said bracket mounting portion caulked so as to be bulged and fill and abut against the tapered surface of the insert hole and clamps the mounting bracket between the flange and the bulged portion of the bracket mounting portion; and
   wherein said bracket mounting portion is formed at an outer peripheral surface thereof with a protrusion in a ridge manner and said insert hole is formed with a recess on said inner surface, said protrusion is engaged with said recess upon insertion of said bracket mounting portion into said insert hole to prevent relative circumferential rotation between the fitment body and the mounting bracket during the caulking operation.

2. An intermediate coupler according to claim 1, including a step formed on an inner surface of said insert hole, said step provides a space extending radially outward from the tapered surface to the outer surface of the mounting bracket and the bulged portion of the bracket mounting portion fills said spaced provided by said step.

3. An intermediate coupler according to claim 1, wherein each of said hose joints includes a sleeve and a nipple with a radial gap therebetween, said radial gap is capable of receiving an end of a hose therein, and said nipples of the hose joints communicate with each other through a passage in said intermediate base portion.

* * * * *